(12) United States Patent
Peemen et al.

(10) Patent No.: US 12,392,735 B2
(45) Date of Patent: Aug. 19, 2025

(54) SPARSE IMAGE RECONSTRUCTION FROM NEIGHBORING TOMOGRAPHY TILT IMAGES

(71) Applicant: FEI Company, Hillsboro, OR (US)

(72) Inventors: Maurice Peemen, Rijsbergen (NL); Holger Kohr, Eindhoven (NL); Pavel Potocek, Eindhoven (NL)

(73) Assignee: FEI Company, Hillsboro, OR (US)

( * ) Notice: Subject to any disclaimer, the term of this patent is extended or adjusted under 35 U.S.C. 154(b) by 887 days.

(21) Appl. No.: 17/329,081

(22) Filed: May 24, 2021

(65) Prior Publication Data

US 2022/0373481 A1    Nov. 24, 2022

(51) Int. Cl.
*G01N 23/046* (2018.01)
*G06T 7/00* (2017.01)
*G06T 7/33* (2017.01)
*G06T 11/00* (2006.01)

(52) U.S. Cl.
CPC ......... *G01N 23/046* (2013.01); *G06T 7/0016* (2013.01); *G06T 7/337* (2017.01); *G06T 11/005* (2013.01); *G01N 2223/401* (2013.01); *G06T 2207/10061* (2013.01); *G06T 2207/10084* (2013.01); *G06T 2207/30024* (2013.01); *G06T 2211/408* (2013.01); *G06T 2211/424* (2013.01)

(58) Field of Classification Search
None
See application file for complete search history.

(56) References Cited

U.S. PATENT DOCUMENTS

2013/0114872 A1*  5/2013  Chen .................. G06T 7/11
                                                382/131

OTHER PUBLICATIONS

Collier et al. ("Towards Independent Particle Reconstruction from Cryogenic Transmission Electron Microscopy", Interactive 3D Graphics and Games, ACM, 2 Penn Plaza, Suite 701 New York NY 10121-0701 USA, Sep. 22, 2013 (Sep. 22, 2013), pp. 525-534, XP058501272, DOI: 10.1145/2506583.2506622 ISBN: 978-1-4503-2717-6.*
Collier et al., "Towards Independent Particle Reconstruction from Cryogenic Transmission Electron Microscopy," Interactive 3D Graphics and Games, ACM, XP058501272, pp. 525-534 (Sep. 22, 2013).
Extended Search Report for related EP Application No. 22175116.7, 8 pages, mailed Oct. 7, 2022.
Buchholz et al., "Cryo-care: content-aware image restoration for cryo-transmission electron microscopy data," retrieved from https://arxiv.org/abs/1810.05420, 5 pages (Oct. 12, 2018). Also published in *2019 IEEE 16th International Symposium on Biomedical Imaging* (ISBI 2019), pp. 502-506 (Apr. 8-11, 2019).

(Continued)

*Primary Examiner* — Andrew Smyth
(74) *Attorney, Agent, or Firm* — Klarquist Sparkman, LLP

(57) ABSTRACT

Tomographic images are obtained by processing a tilt series of 2D images by aligning and combining images withing a group of neighbor images. The tilt series generally includes sparsely sampled images. Images of the tilt series at tilt angles associated with the sparsely sample images are selected as reference frames, grouped with neighbor images, and the group of images aligned. The aligned images are combined to produce replacement frames and a replacement frame tilt series that can be used for tomographic reconstruction.

21 Claims, 9 Drawing Sheets

(56) References Cited

OTHER PUBLICATIONS

Donati et al., "Compressed sensing for STEM tomography," *Ultramicroscopy*, vol. 179, pp. 47-56 (Apr. 6, 2017).

Hendriksen et al., "Noise2Inverse: Self-supervised deep convolutional denoising for tomography," retrieved from https://arxiv.org/abs/2001.11801, 16 pages (Jan. 31, 2020). Also published in *IEEE Transactions on Computational Imaging*, vol. 6, pp. 1320-1335 (Aug. 26, 2020).

\* cited by examiner

SPARSE IMAGE RECONSTRUCTION FROM NEIGHBORING TOMOGRAPHY TILT IMAGES

FIELD

The disclosure pertains to electron tomography.

BACKGROUND

Transmission electron microscopes (TEMs) can be used to obtain high resolution images that reveal important details of many kinds of samples, including biological samples. In electron beam tomography, multiple images of a sample are needed for image reconstruction. Even if low doses are used for each image, acquisition of multiple images can produce sample damage so that the final acquired images do not correspond to the initial sample structure. In addition, acquisition of multiple images can require long image acquisition times. Improved approaches that permit satisfactory imaging without producing unacceptable sample damage are needed.

SUMMARY

The disclosed approaches can reduce the time needed to obtain tomographic images in charged particle (CP) tomography and can also permit lower total charged particle beam (CPB) dose to be used. In some examples, methods comprise obtaining a tilt series of images based on exposure of a sample to a charged particle beam (CPB) at a plurality of tilt angles. An image of the obtained tilt series is selected as a reference frame and combined with one or more neighbor images in the obtained tilt series to produce a replacement frame. A tomographic sample image is produced based on at least some images of the obtained tilt series and the replacement frame. In typical examples, the images of the obtained tilt series are associated with a fixed angular increment. The obtained tilt series can include at least one sparse image associated with selected tilt angle, wherein an image associated with the selected tilt angle is selected as the reference frame. The sparse image in the obtained tilt series can be replaced with the replacement frame and the tomographic sample image produced based on the obtained tilt series with the replacement frame.

In representative examples, the obtained tilt series includes a plurality of sparse images, and the methods further include selecting images associated with tilt angles for each of the sparse images as reference frames, combining each of the reference frames with one or more respective neighbor images in the obtained tilt series to produce respective replacement frames, and producing the tomographic sample image based on the images of the obtained tilt series and the replacement frames. In some cases, combining each of the reference frames with one or more respective neighbor images in the obtained tilt series to produce the respective replacement frames includes aligning the references frames and the respective neighbor images. In additional examples, the reference frames in the obtained tilt series are replaced with the respective replacement frames and the tomographic sample image is produced based on the tilt series with the replacement frames. Typically, at least two of the sparse images are associated with different sparsities. A CPB system such as an electron beam system can be used to acquiring a tilt series, wherein the obtained tilt series is the acquired tilt series. Alternatively, the obtained tilt series is a reconstructed tilt series.

The one or more neighbor images can include at least a first image associated with a tilt angle that is less than a tilt angle associated with the reference frame and at least one image associated with a tilt angle that is greater than the tilt angle associated with the reference frame. In some examples, the one or more neighbor images includes at least one adjacent image.

CPB imaging systems include a CPB source operable to produce a CPB, a CPB optical system operable to selectively direct the CPB from the CPB source to a sample, a detector situated to receive radiation in response to irradiation of the sample with the CPB, and a stage, wherein at least one of the stage and the CPB optical system is configured to tilt the sample with respect to the CPB. A controller is operably coupled to the stage, the CPB optical system, and the detector to acquire a tilt series of images, wherein at least one of the images is sparse image. The controller is operable to select one or more tilt angles for acquisition of sparse images so that the CPB is directed to the sample to obtain image data only at selected sample locations. The controller is also operable to produce a tilt series of reconstructed images from the acquired tilt series and to determine replacement frames associated with each of tilt angles at which sparse images are acquired. The replacement frames are determined based on respective reference frames associated with corresponding tilt angles at which sparse images are acquired and two or more neighbor images in the tilt series of reconstructed images.

In a typical example, the CPB imaging is an electron microscope, and the controller is operable to determine the replacement frames by aligning the two or more neighbor images in the tilt series of reconstructed images and the associated reference frames, and produce a tomographic image of the sample based on the tilt series of reconstructed images and the replacement frames.

Methods of producing a tomographic image of a sample with an electron microscope include selecting a series of tilt angles for image acquisition and selecting a plurality of the tilt angles of the series of tilt angles for acquisition of sparse images. A tilt series of images is acquired with the electron microscope based the selected series of tilt angles, including acquiring sparse images for the plurality of tilt angles associated with acquisition of sparse images. A tilt series of reconstructed image is produced based on the acquired tilt series and one or more of the reconstructed images are selected as reference frames. Each of the reference frames and the associated neighbor images are aligned based on the respective tilt angles and the aligned reference frames and the associated neighbor images are combined to produce corresponding replacement frames. A replacement frame tilt series is produced by replacing the reference frames with the corresponding replacement frames and a tomographic image of the sample is produced based on the replacement frame tilt series. In some examples, at least one non-transitory computer-readable medium comprises processor-executable instructions for such methods.

The foregoing and other, features and advantages of the disclosed technology will become more apparent from the following detailed description, which proceeds with reference to the accompanying figures.

BRIEF DESCRIPTION OF THE DRAWINGS

FIG. 3A illustrates sample tilts, FIG. 3B illustrates local alignment, and FIG. 3C illustrates fully aligned images based on local alignment and stretching.

DETAILED DESCRIPTION

As used herein, image refers to a visual image viewable on a display or other device or a data set or data file corresponding to such a viewable image. Such data sets can be arrays of image intensities associated with two dimensional coordinates. As used herein, a tilt series or tilt series of images refers to a set of 2D images associated with a range of sample tilt angles with respect to a CPB, and typically tilt angles defined by a fixed angular increment. Sample tilt angles can be produced by tiling the sample with respect to the CPB, tilting the CPB with respect to the sample, or a combination thereof. The images in a tilt series can be acquired images, reconstructed images, or aligned images such as an acquired tilt series, a reconstructed tilt series, locally or fully aligned tilt series, or neighbor-combined tilt series. In some examples, one or more images in a tilt series are combined to form an image that is used to replace an image in the tilt series. This replacement image is referred to as a replacement frame. Combining of images in a tilt series is generally performed by selecting a particular image, referred to as a reference frame, and one or more neighbor images, and combining these images. Neighbor images are images at nearby tilt angles. Typically, in a series of tilt angles $\alpha_1, \alpha_2, \ldots, \alpha_{N-1}, \alpha_N$, an image associated with the tilt angle $\alpha_j$ is selected as a reference frame, and neighbor images are those associated with tilt angles greater than $\alpha_j$ within an angular range $\Delta_+$ and those associated with tilt angles less than $\alpha_j$ within an angular range $\Delta_-$. Neighbor images need not include both tilt angles greater and smaller that the reference frame tilt angle, nor are all tilt angles within the angular ranges necessarily used. In typical examples, a few tilt angles are used, including adjacent tilt angles, for example, for the reference frame associated with $\alpha_j$, neighbor images can be those associated with $\alpha_{j-k}$, $\alpha_{j-k+1} \ldots, \alpha_{j-1}$ and $\alpha_{j+m}, \alpha_{j+m-1} \ldots, \alpha_{j+1}$, wherein j and m are integers and the tilt angles $\alpha_{j-1}$ and $\alpha_{j+1}$ are referred to as adjacent tilt angles to tile angle $\alpha_j$. In addition, the term "frame" is also used to refer to two dimensional images such the images of a tilt series or images produced by combining or reconstructing two dimensional images. As disclosed herein, one or more such images can be tomographically processed to produce a tomographic image of a sample, typically to produce a volume rendering of at least a portion of a sample that is referred to as a tomographic image of a sample volume.

Example 1

Figure 1A:
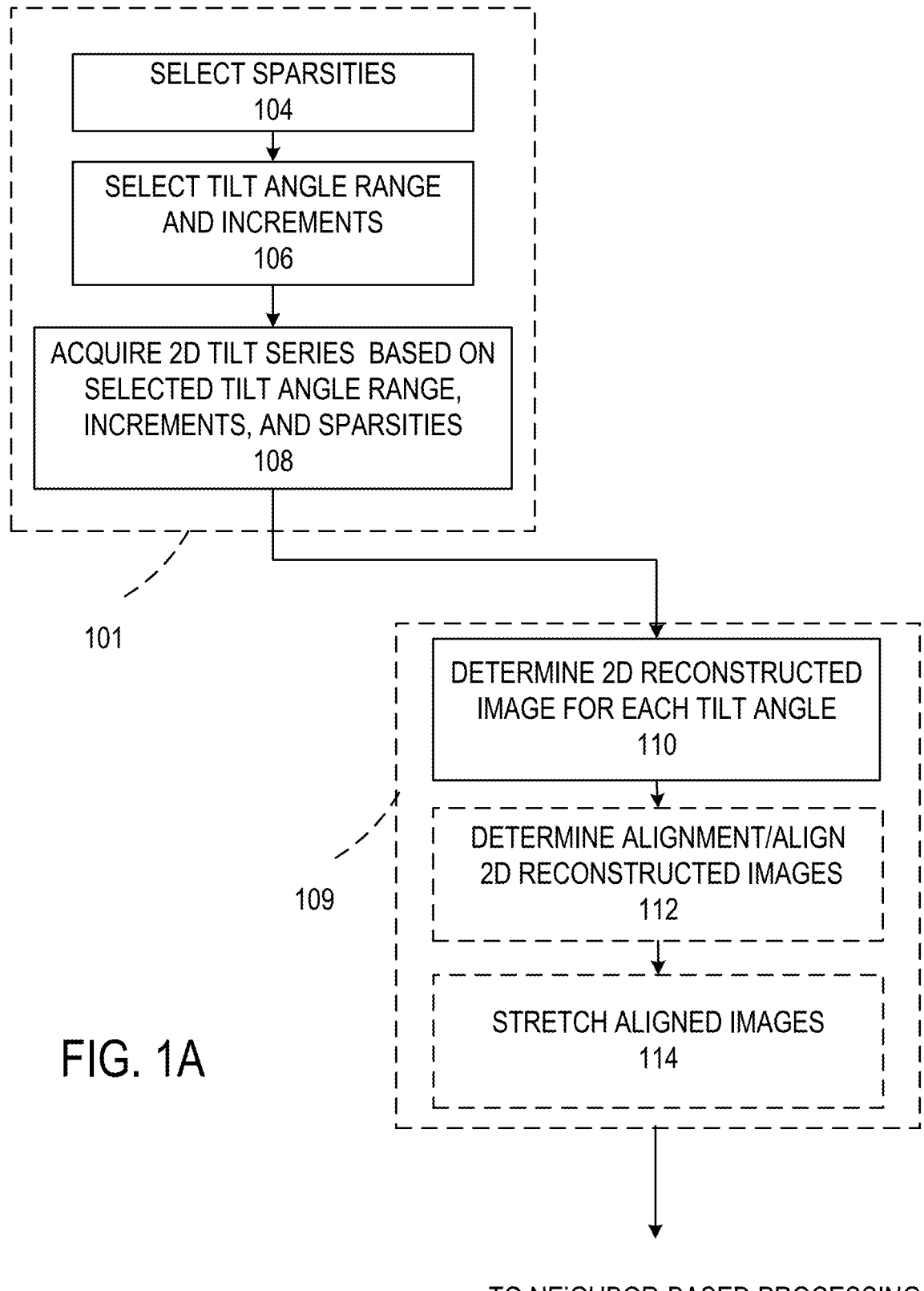
FIG. 1A illustrates a representative method of acquiring a series of images in a range of sample tilts and fully aligning the acquired images.

Referring to FIG. 1A, a representative image acquisition method 101 includes selecting image sparsity at 104, i.e., selecting a number or percentage or other measure of completeness of image acquisition for some or all images to be acquired. This image sparsity can vary as a function of tilt angle. For example, at large tilt angles, high frequency information is generally lost, so sparser sampling could be used at such tilt angles. This could provide more rapid image acquisition and/or permit higher dose exposures at lower tilt angles. Typically, measurements at 1-50%, 5-40%, or 10-30% of independent scan locations are obtained. Sampling only some scan locations can reduce total sample exposure (for example, electron beam dose) or reduce acquisition time. In some examples, scan locations at which measurements are to be made are randomly selected. In some examples, different sparsities can be used for some or all tilt angles. At 106, a tilt angle range and angular increment are selected, and at 108, a series of 2D images is acquired based on the selected angular increment, angular range, and sparsity. Typically, 2D images associated with tilt angles within 5-10 angular increments are based on different selections of scan locations. The set of acquired images is referred to herein as an acquired tilt series. While a fixed tilt increment can be used, a tilt series can be based on varying angular increments so that images are not evenly spaced as a function of tilt angle.

Example 2

Figure 2A:
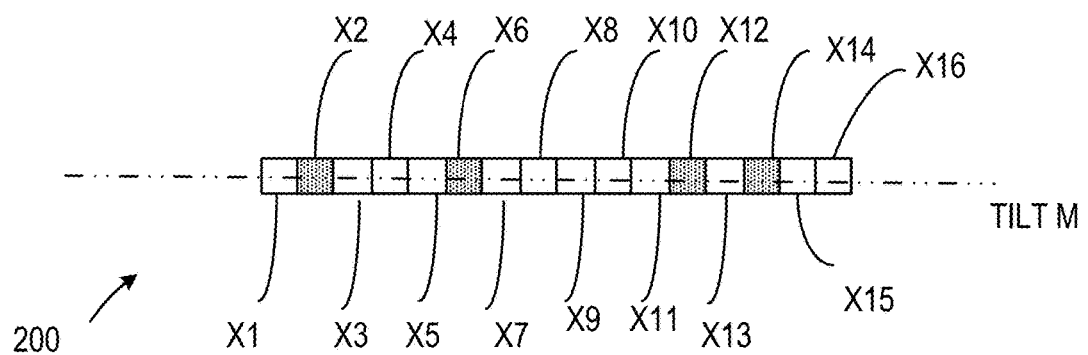
FIGS. 2A-2B illustrate acquisition of sparse images for two representative tilt angles.
Figure 2B:
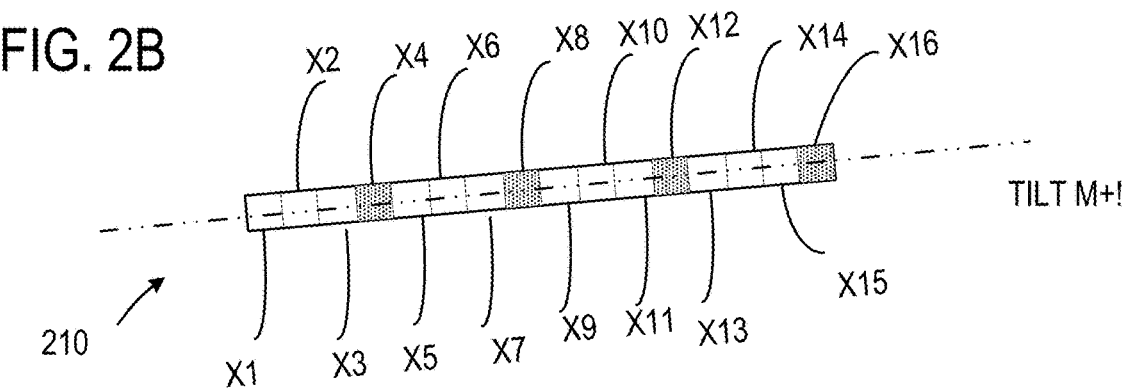

Sparse sampling in image acquisition for electron beam tomography is illustrated in FIGS. 2A-2B. For convenient illustration, sparse sampling along a single axis is shown with reference to 16 sample locations. In practical examples, sparse sampling is two dimensional and sampled locations are selected from an array of sample locations that typically includes as many as 100, 1000, or 10,000 or more positions along each of two orthogonal axes. In FIG. 2A, a sample 200 situated at an $M^{th}$ tilt angle is irradiated at locations X2, X6, X12, X14 and the associated transmitted beam currents are measured to produce an $M^{th}$ acquired image. Other locations are not irradiated. FIG. 2B illustrates irradiation of the sample 200 at an $(M+1)^{th}$ tilt angle and measurement of transmitted beam current associated with locations X4, X8, X12, X16 while other locations are not irradiated to obtain an $(M+1)^{th}$ acquired image.

Example 3

Referring again to FIG. 1A, a method 109 of processing the acquired sparse images (i.e., the acquired tilt series) includes computing a 2D reconstructed image for some or all of the acquired sparse images for some or all tilt angles at 110 to produce a reconstructed tilt series. A variety of techniques can be used for such reconstruction including interpolation, data discrepancy minimization regularized by total variation or L1 energy, dictionary-based iterative reconstruction, or neural network sparse reconstruction. At 112, the 2D reconstructed images are locally aligned using cross-correlation or other techniques such as patch-based image tracking, optical flow, neural network based motion compensation, mutual information, kernelized correlation filters, or deep learning-based alignment such as adversarial similarity networks to produce a locally aligned tilt series. In some cases, offsets used to locally align the 2D reconstructed images are recorded. At 114, the locally aligned, 2D reconstructed images are stretched based on their respective tilt angles to produce a fully aligned reconstructed tilt series corresponding to the acquired tilt series. The 2D reconstructed images need not be either aligned or stretched as shown, and these steps can be performed during neighbor-based processing as discussed below.

Example 4

Figure 3A:
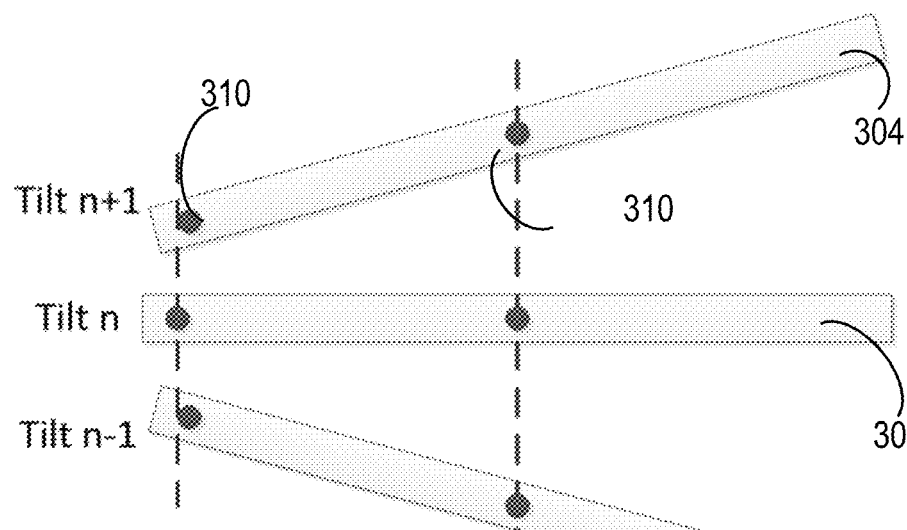
FIGS. 3A-3C illustrate aligning and stretching images of a tilt series.
Figure 3B:
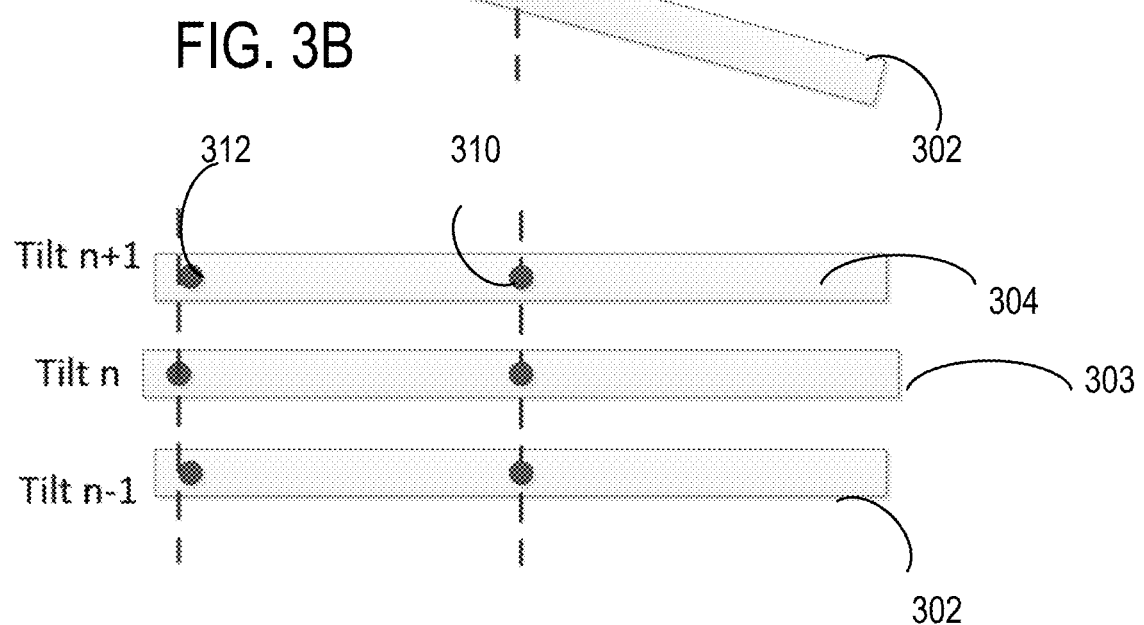
Figure 3C:
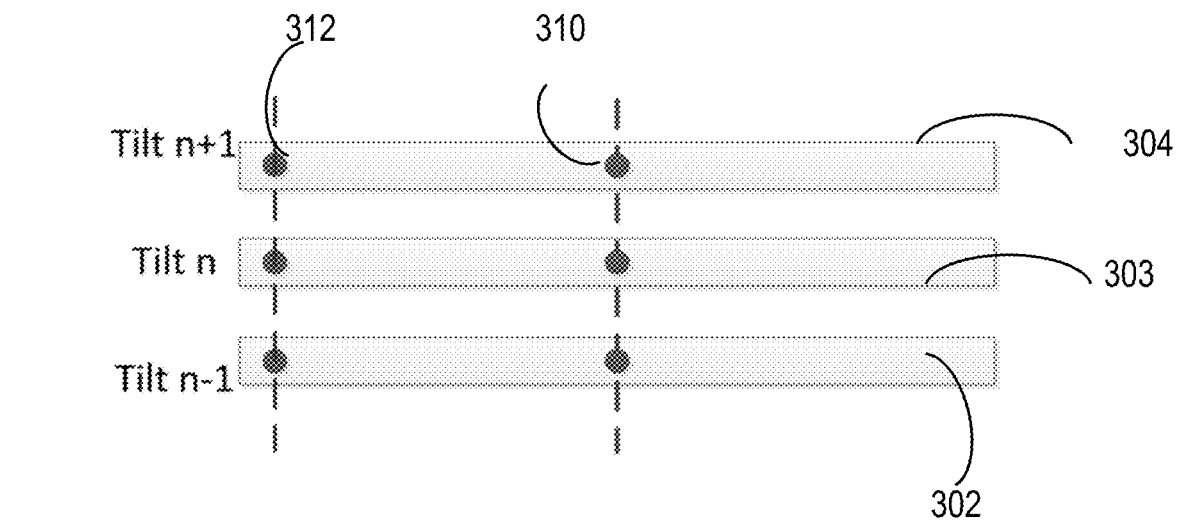

FIG. 3A illustrates portions of 2D reconstructed images 302, 303, 304 associated with tilts n+1, n, n−1, respectively, that are locally aligned as shown in FIG. 3B in which a first specimen location 310 is aligned on each of the 2D reconstructed images while a second specimen location 312 is not aligned due to the different tilt angles. Because the 2D reconstructed images are associated with different tilt angles, image alignment tends to vary across the 2D reconstructed images in a direction perpendicular to an axis of rotation associated with the sample tilts. If, for example, images are aligned with respect to a 2D reconstructed image associated with a reference tilt angle of 0°, other 2D reconstructed images are stretched by $1/\cos(\theta)$, wherein $\theta$ is the respective tilt angle. Referring to FIG. 3C, the stretched reconstructed images are fully aligned at specimen locations 310, 312 and not merely locally aligned, producing a fully aligned reconstructed tilt series. If a reference tilt angle $\theta_i$, is selected, a stretch factor based on a ratio $\cos(\theta_i)/\cos(\theta_{i+j})$ is applied for a $j^{th}$ image in the tilt series that is associated with a tilt $\theta_{i+j}$.

Example 5

Figure 1B:
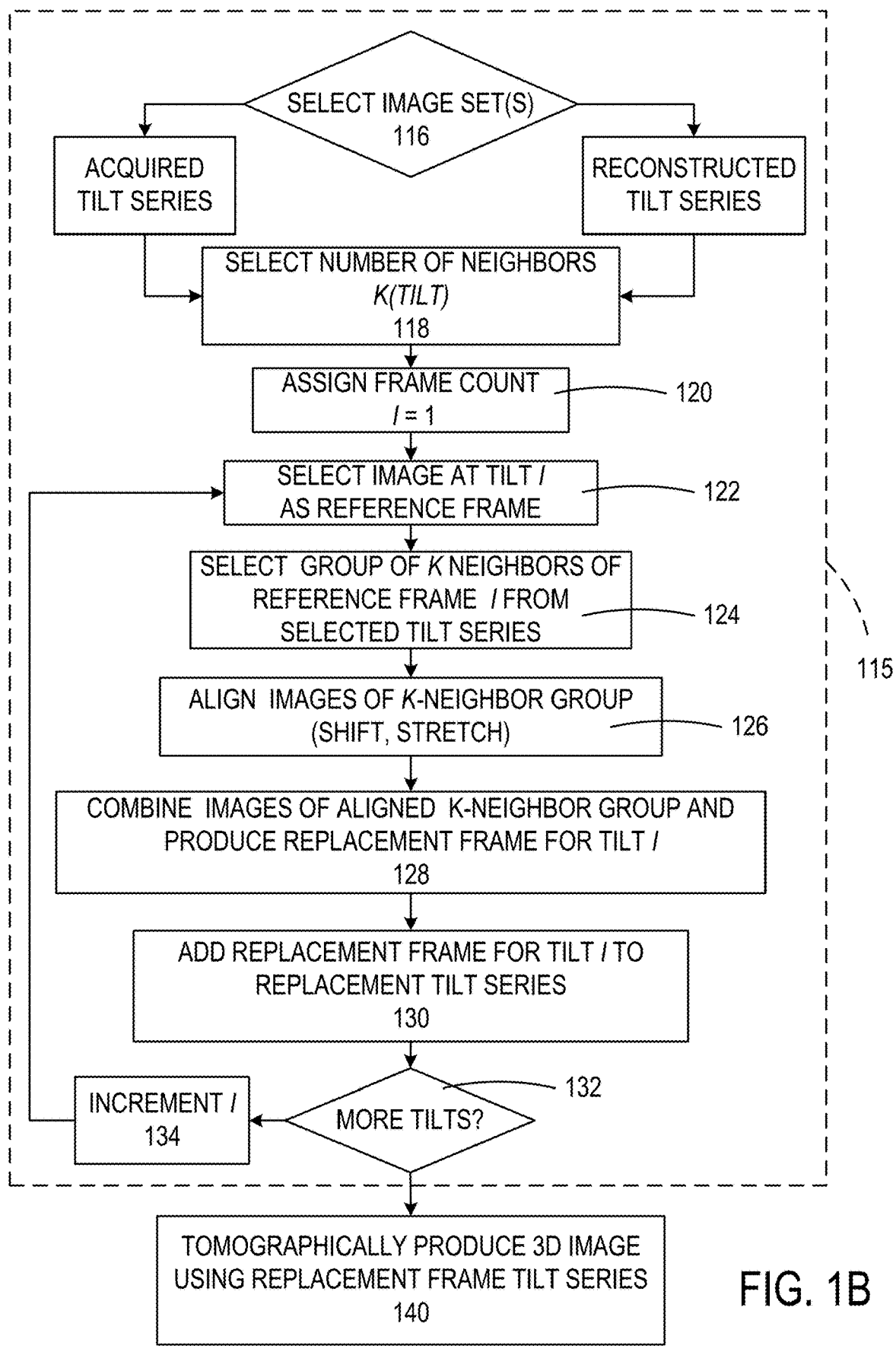
FIG. 1B illustrates a method of neighbor-based image combining and tomographic reconstruction using neighbor-based combined images.

Referring to FIG. 1B, a neighbor-based image processing method 115 includes selecting an image set such as the acquired tilt series or a reconstructed tilt series at 116. If the reconstructed tilt series is selected, each of the 2D reconstructed images can be received as aligned as discussed above, but typically the reconstructed tilt series is received without alignment. At 118, a number of neighbors K(TILT) is selected to determine a number of images to be combined at each tilt. While K(TILT) can be a constant, different numbers of neighbors (including no neighbors) can be selected for some, all, or each tilt. At 120, an image counter I is assigned an initial value to indicate an $I^{th}$ image of a tilt series. In some cases, I=1, indicating the first image of the tilt series. At 122, the image associated with the $I^{th}$ image of a tilt series is selected as a reference frame. At 124, a neighbor group of K(I) neighbors of the reference frame is selected, and at 126, the K(I) images of the neighbor group are aligned with the reference frame by shifting and stretching or other operations as discussed above. At 128, some or all images of the selected image set as aligned are combined to produce an $I^{th}$ replacement frame. For example, for K=3, an $I^{th}$ image is combined with an $(I+1)^{th}$ image and $(I-1)^{th}$ image, so that K=3 images are used to produce a combined $I^{th}$ image (i.e., the $I^{th}$ replacement frame). Typically, the $I^{th}$ acquired image is associated with a tilt angle $\theta_I$, and the $(I+1)^{th}$ image and $(I-1)^{th}$ image are associated with tilt angles $\theta_{I+1}=\theta_I+\Delta\theta$ and $\theta_{I-1}=\theta_I-\Delta\theta$, wherein $\Delta\theta$ is the tilt increment. As discussed above, the tilt increment need not be constant. At 130, the $I^{th}$ replacement frame is added to a replacement tilt series. If images at additional tilts are to be processed as determined at 132, the image counter I is incremented at 134 and a reference frame is selected based on the incremented image counter I. Some or all images of the selected tilt series can be similarly processed to produce a replacement tilt series. The replacement tilt series can be tomographically reconstructed at 140 to produce a 3D image. The acquired tilt series can be processed similarly.

While typically the reconstructed tilt series is used to determine alignments and processed to generate the replacement tilt series, the alignments determined with the reconstructed tilt series can be applied to the acquired tilt series and the K neighbor images selected from the acquired tilt series and combined to generate the replacement tilt series. In this case, the reconstructed tilt series is used to determine alignments only. In other examples, combinations of images from the reconstructed tilt series and the acquires tilt series are used to generate replacement frames.

The number of neighbors selected (K) typically is between 3 and 30, 3 and 10, or 3 and 5, but K can be larger or smaller. Large values take more contextual information into account, i.e., boost the number of sampling points per image by taking sampling points from neighbors. This can be at the expense of resolution if such information is contradictory (which happens is some cases such as for thick samples in which stretching is not enough). In typical examples, images at tilts greater than and smaller than that of a selected image are used, but images only at angles larger or smaller than a particular tilt angle can be used as well. For example, to produce an $n^{th}$ replacement frame using K neighbors, the $n^{th}$ image can be combined with $(n+1)^{th}$, $(n+2)^{th}$, . . . , $(n+K-1)^{th}$ images.

Figure 1C:
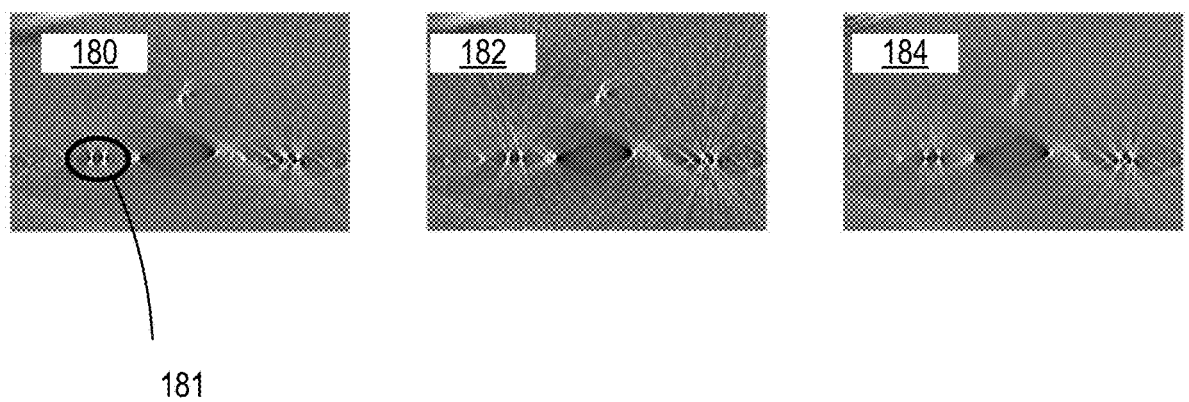
FIG. 1C illustrates image sections demonstrating image improvement using neighbor-based processing.

FIG. 1C illustrates image slices in a tomographically reconstructed volume perpendicular to a tilt axis, where artefacts from sparse sampling are expected to be best visible. These reconstructions were based on tilt series obtained with obtained with full frame acquisition (image 180), sparse image reconstruction (182), and sparse image reconstruction with neighbor-based processing (in this example, 5 neighbor images). A representative area 181 is indicated in the image 180 and it is apparent that the deficiencies introduced by using sparse images as shown in the image slice 182 are reduced in the image slice 184 in which neighbor combinations were used.

Example 6

Figure 4:
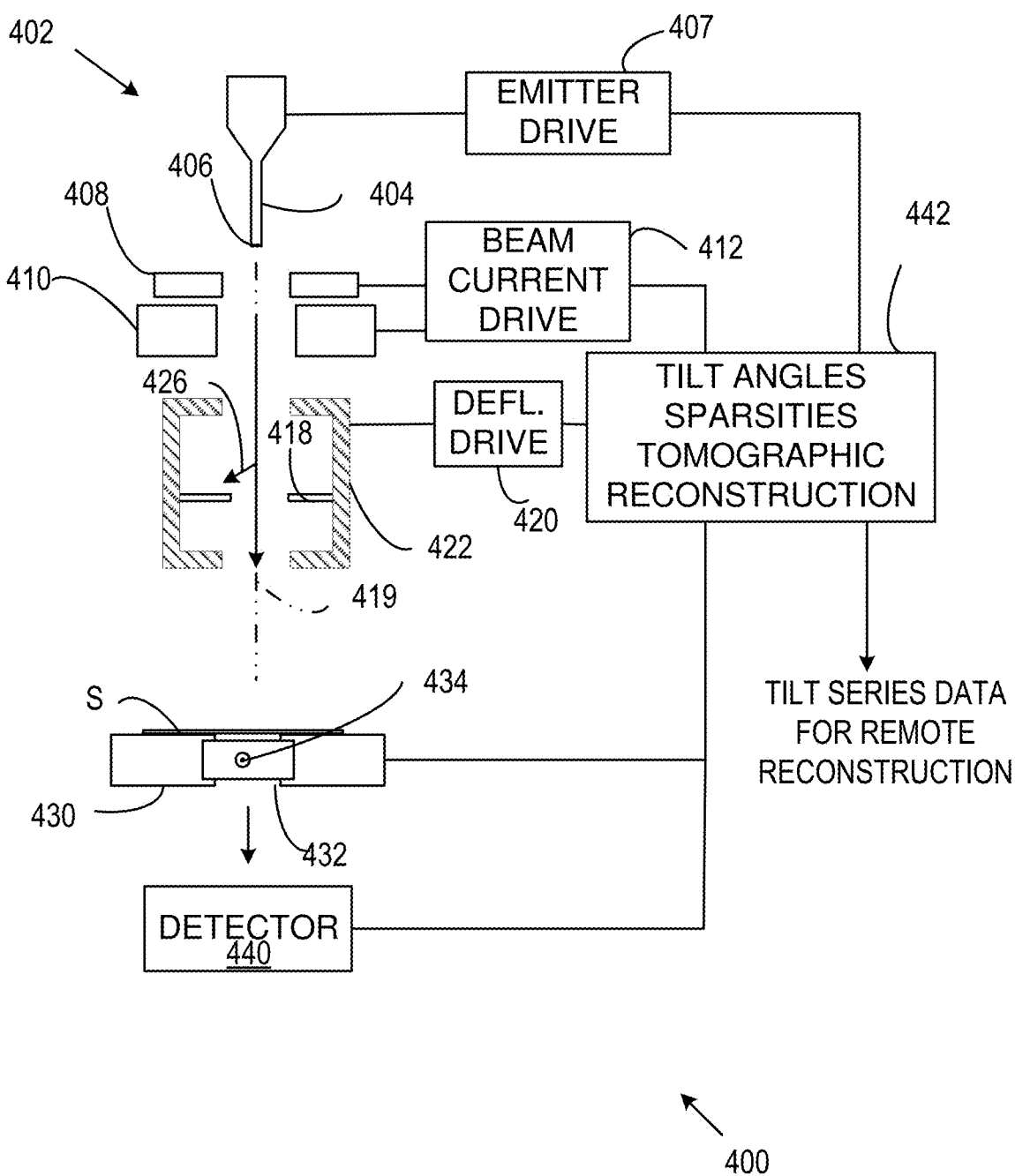
FIG. 4 illustrates a representative CPB system operable to acquire and process a tilt series.

Referring to FIG. 4, a CPB system 400 includes a CPB emitter 402 that can include a field emitter 404 or other emission source that produces a CPB from an emitter tip 406. In typical examples, the CPB is an electron beam. CPB current can be controlled by one or more of a voltage applied to the field emitter 404 or emitter tip 406 as provided by an emitter drive 407. A suppressor electrode 408 is situated about the field emitter 404, typically to suppress stray charged particle emissions, and an extractor electrode 410 is situated to establish a voltage with respect to the emitter tip 406 to induce a selected CPB current. A beam current drive 412 is coupled to the suppressor electrode 408 and the extractor electrode 410. As shown in FIG. 4, any or all of the suppressor electrode 408, the extractor electrode 410, and the field emitter 404 or emitter tip 406 can be controlled with the emitter drive 407 or the beam current drive 412 to produce a variable CPB so that a sample S can be exposed to selected CPB current. One or more additional beam apertures can be situated along a CPB system axis 419 and can be used to control the CPB by, for example, selectively blocking the CPB. The example of FIG. 4 can also control the CPB using a gun lens, but such a lens is not shown. In addition to the CPB controls provided by driving one or more CPB lenses, deflectors, aperture plates or other CPB optical elements, the CPB can be produced in response to irradiation of a suitable target with an optical beam or beams.

The sample S is situated on a sample stage 430 that is rotatable about an axis 434 to a desired angle α (i.e., a tilt angle) in response to activation of a motor or other mechanism 432. In some embodiments, all angles of a sample may be available due to the continuous rotation of the sample. While all angles are available, some angles, depending on sample shape, may be avoided due to limited data collection. For example, angles that present a face of a sample that requires the CPB to transmit through a relatively long portion of the sample may be undesirable. Tilt angles are generally selected from a predetermined range of tile angles and can be spaced apart with a fixed or variable increment. In addition, at some or all tilt angles, sparse images are obtained by measuring sample response only at selected sample locations. For example, while a rectangular image can be obtained by measurement of sample response at an array of sample locations defined by coordinates $(x_i, y_j)$, wherein i, j are integers, image data is not obtained at some values of i, j. The sample is adjusted through a plurality of angles and the CPB is applied to produce charged particles (e.g., scattered CPB portions, secondary electrons, transmitted electrons) or electromagnetic radiation (e.g., X-rays) that are received by a detector 440 to produce corresponding images at the specified coordinates $(x_i, y_j)$. These images form a tilt series that can be subsequently tomographically processed. A controller 442 is coupled to position the sample S at the plurality of angles and acquire image data. The controller 442 can also be operable to determine image sparsity and implement tomographic reconstruction as discussed above with reference to FIGS. 1A-1B. While a tilt series can be obtained with unidirectional rotation, random or other rotations can be used.

Example 7

Figure 5:
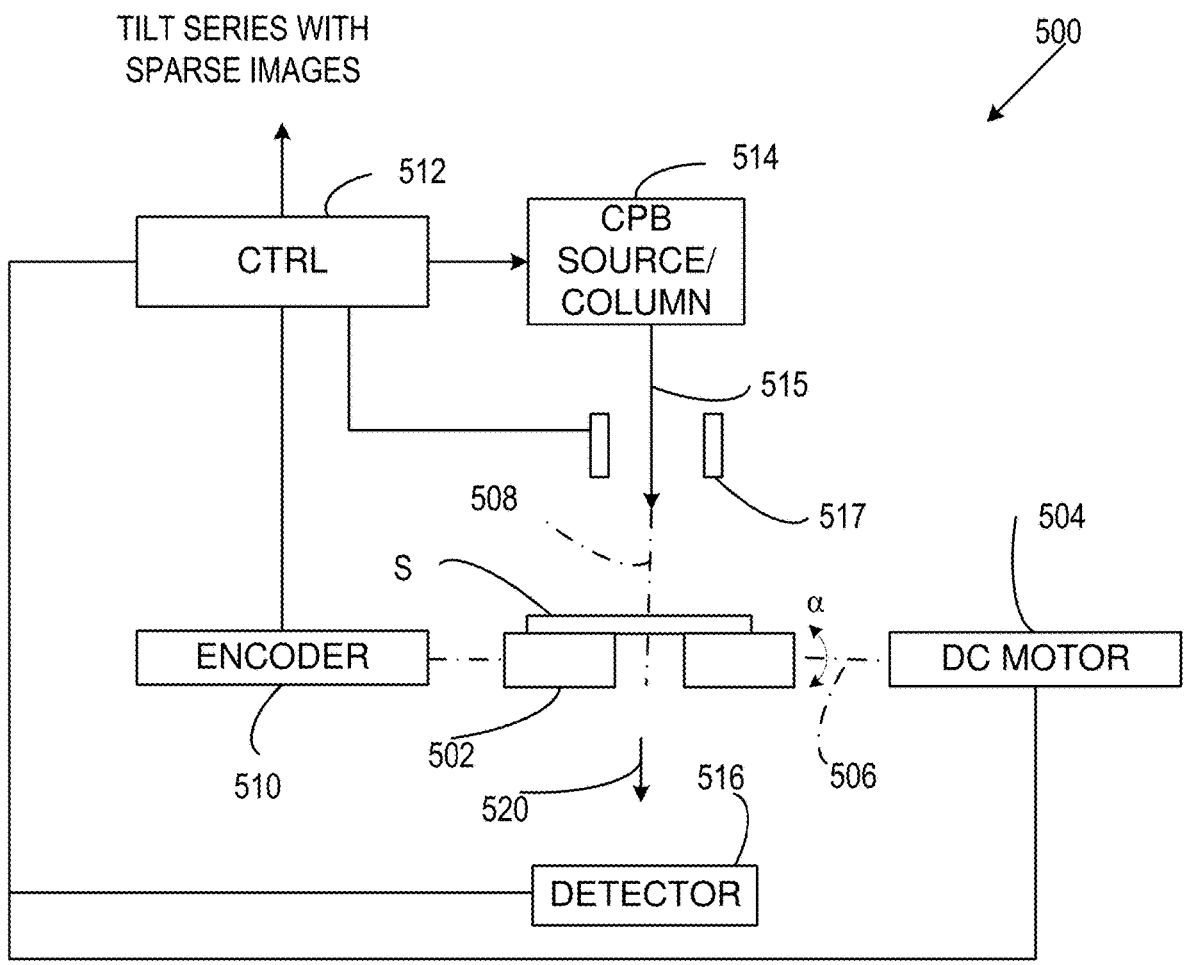
FIG. 5 illustrates a representative CPB system that acquires tilt series in which at least some images are sparse images.

With reference to FIG. 5, a CPB imaging system 500 includes a sample stage 502 that is configured to retain a sample S. The sample stage 502 is coupled to a DC motor 504 so that the sample S is rotatable through an arbitrary angle α about an axis 506 that is non-parallel (typically perpendicular) to a CPB exposure axis 508. An encoder 510 provides an indication of rotation angle to a controller 512 that is coupled to a CPB source or CPB column 514 that provides exposures of the sample S to a the CPB 515 as the CPB 515 is scanned with the beam scanner 517 to selected sample locations. The beam scanner 517 can be controlled to set beam exposure time at selected locations by slow or halting scanning. To reduce dose at sample areas that are not selected in a particular image acquisition, the beam scanner 517 can provide a more rapid scan are to the CPB column can be controlled to reduce CPB current. A detector 516 is situated to receive electromagnetic radiation or charged particles 520 from the sample S in response to exposure to the CPB 515. For example, X-rays, secondary electrons, scattered electrons or other scattered, reflected, diffracted charged particles can be produced. The detector 516 is coupled to the controller 512 and provides image data to the controller 512. The controller 512 can be configured to process the received images, direct the received images for remote processing, as well as controlling the CPB source/column 514, the DC motor 504, the sample stage 502 as well as receiving rotation data from the encoder 510. The controller can provide CPB deflections with the beam deflector 517 to acquire a full or sparse image at any tilt angle as well as setting the sample S at selected tilt angles. In the example of FIG. 5, the controller 512 provides tilt series with at least some sparse images for output, and processing as described above is performed in one or more remote processors. However, this processing can be provided by the controller 512 with suitable processor-executable instructions.

Example 8

Figure 6:
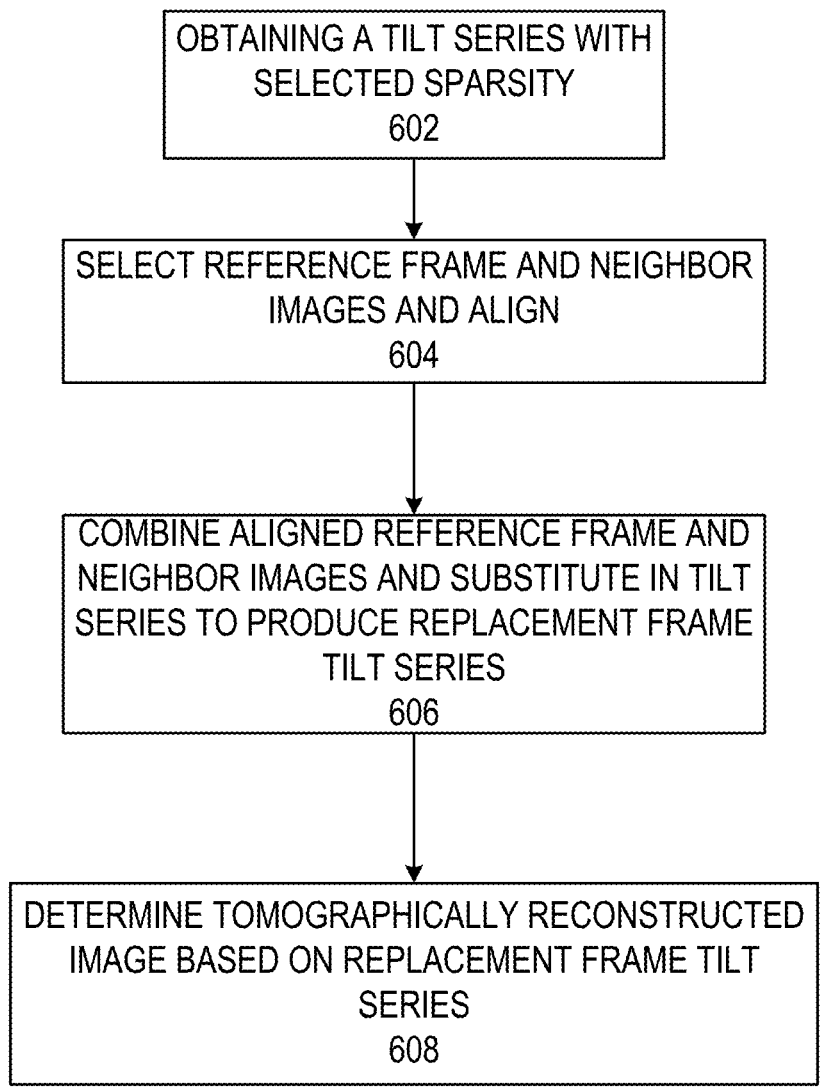
FIG. 6 illustrates a representative method of producing a tomographic image using a CPB.

Referring to FIG. 6, a representative method 100 includes obtaining a tilt series that includes at least some sparse images at 602. At 604, at least one image of the tilt series is processed by selecting it as a reference frame and selecting neighbor images within a range of neighboring tilt images with the reference frame. The reference frame and selected neighbor images are aligned, typically with respect to the reference frame at 606 but alignment can be done with respect to any image in the tilt series or tilt angle. Typically, the reference frame and the neighbor images are aligned with each other by stretching or shifting. In some cases, image stretching is performed to compensate for the different tilt angles associated with images. The reference frame and the neighbor images are combined at 606 to become a replacement frame that can be used to replace one or more of the reference frame and the neighbor images. Substitution with the replacement frames in the tilt series results in a replacement frame tilt series which can be processed at 608 to produce a tomographic image.

Example 9

Figure 7:
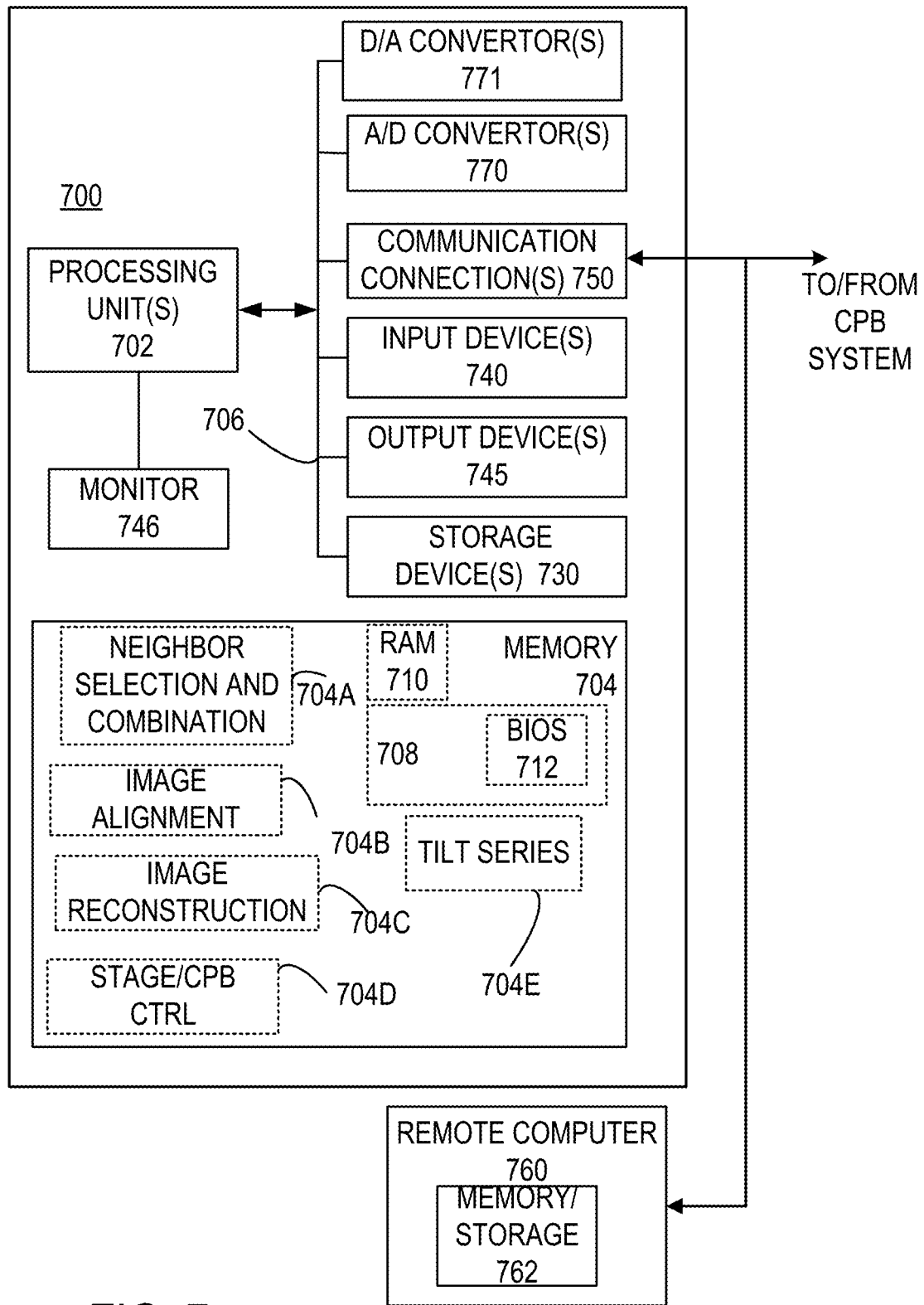
FIG. 7 illustrates a representative computation and control environment for use with any of the disclosed methods and apparatus.

FIG. 7 and the following discussion are intended to provide a brief, general description of an exemplary computing environment in which the disclosed technology may be implemented. Although not required, the disclosed technology is described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 7, an exemplary system for implementing the disclosed technology includes a general purpose computing device in the form of an exemplary conventional PC 700, including one or more processing units 702, a system memory 704, and a system bus 706 that couples various system components including the system memory 704 to the one or more processing units 702. The system bus 706 may be any of several types of bus structures including a memory bus or memory controller, a peripheral bus, and a local bus using any of a variety of bus architectures. The exemplary system memory 704 includes read only memory (ROM) 708 and random-access memory (RAM) 710. A basic input/output system (BIOS) 712, containing the basic routines that help with the transfer of information between elements within the PC 700, is stored in ROM 708.

The exemplary PC 700 further includes one or more storage devices 730 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 706 by a hard disk drive interface, a magnetic disk drive interface, and an optical drive interface, respectively. The drives and their associated computer-readable media provide nonvolatile storage of computer-readable instructions, data structures, program modules, and other data for the PC 700. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 730 including an operating system, one or more application programs, other program modules, and program data. A user may enter commands and information into the PC 700 through one or more input devices 740 such as a keyboard and a pointing device such as a mouse. Other input devices may include a digital camera, microphone, joystick, game pad, satellite dish, scanner, or the like. These and other input devices are often connected to the one or more processing units 702 through a serial port interface that is coupled to the system bus 706 but may be connected by other interfaces such as a parallel port, game port, or universal serial bus (USB). A monitor 746 or other type of display device is also connected to the system bus 706 via an interface, such as a video adapter. Other peripheral output devices, such as speakers and printers (not shown), may be included.

The PC 700 may operate in a networked environment using logical connections to one or more remote computers, such as a remote computer 760. In some examples, one or more network or communication connections 750 are included. The remote computer 760 may be another PC, a server, a router, a network PC, or a peer device or other common network node, and typically includes many or all of the elements described above relative to the PC 700, although only a memory storage device 762 has been illustrated in FIG. 7. The personal computer 700 and/or the remote computer 760 can be connected to a logical a local area network (LAN) and a wide area network (WAN). Such networking environments are commonplace in offices, enterprise-wide computer networks, intranets, and the Internet.

When used in a LAN networking environment, the PC 700 is connected to the LAN through a network interface. When used in a WAN networking environment, the PC 700 typically includes a modem or other means for establishing communications over the WAN, such as the Internet. In a networked environment, program modules depicted relative to the personal computer 700, or portions thereof, may be stored in the remote memory storage device or other locations on the LAN or WAN. The network connections shown are exemplary, and other means of establishing a communications link between the computers may be used.

As shown in FIG. 7, the memory 710 includes portions 704A, 704B, 704C, 704D that store computer-executable instructions for selecting and combining reference frames and neighbor images, alignment (for example, stretching and offset adjustments), image reconstruction of sparse images, and stage and CPB control, respectively. In addition, a memory portion 704E stores tilt series such as acquired tilt series, reconstructed tilt series, and replacement tilt series. random sequences (or storing one or more such sequences), storing image data, and stage and CPB system control, respectively. Communication with a CPB system or components associated with a CPB system can be provided with one or more analog-to-digital convertors (ADCs) 770 or one or more digital-to-analog convertors (DACs) 771 or via an all-digital connection.

General Considerations

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present, or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest," "best," "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

The term "image" is used herein to refer to displayed image such as on a computer monitor, or digital or analog representations that can be used to produce displayed images. Digital representations can be stored in a variety of formats such as JPEG, TIFF, or other formats. Image signals can be produced using an array detector or a single element detector along with suitable scanning of a sample.

Sample stage rotations (referred to generally in the examples at tilts or tilt angles) can be provided with motors and actuators of various kind, including DC motors, stepper motors, rotary piezoelectric motors, AC motors, or other devices. Rotation angles can be detected with optical encoders, magnetic encoders or other devices. In some cases, tilt sequences are acquired or processed with monotonic variation of tilt angle, but non-monotonic selection of tilt angles can be used, including random selection of tilt angles.

In the above examples particular alignment methods are used. For any images, transformations between images can be use shifts, rotations, affine transforms, or general displacement vector fields (e.g. using optical flow). Alignment can be performed globally, i.e., one frame as an "origin" other frames in the tilt series aligned to that origin. However, that is not strictly necessary. Alternatively, alignment can be done within a neighbor image group with an origin is selected to be the reference frame. That has the advantage that transformations will be smaller than in a global alignment. In local alignment, transformations can be combined with stretching operations to one transformation (per neighbor) reducing a number of image interpolations to one, which is important especially for sparsely sampled data to avoid blur. As used herein, alignment refers to any frame or image adjustment between or among frames for use in combining images or frames.

In view of the many possible embodiments to which the principles of the disclosure may be applied, it should be recognized that the illustrated embodiments are only preferred examples and should not be taken as limiting the scope of the disclosure.

We claim:

1. A method, comprising:
   obtaining a tilt series of images based on exposure of a sample to a charged particle beam (CPB) at a plurality of tilt angles, wherein the obtained tilt series includes one or more sparse images associated with one or more tilt angles;
   selecting an image of the obtained tilt series as a reference frame, wherein the selected image is a sparse image associated with a selected tilt angle;
   combining the reference frame with one or more neighbor images in the obtained tilt series to produce a replacement frame; and
   producing a tomographic image of a sample volume based on at least some images of the obtained tilt series and the replacement frame.

2. The method of claim 1, wherein the images of the obtained tilt series are associated with a fixed angular increment.

3. The method of claim 1, further comprising replacing the sparse image in the obtained tilt series associated with the selected tilt angle with the replacement frame and producing the tomographic image of the sample volume based on the obtained tilt series.

4. The method of claim 1, wherein the obtained tilt series includes a plurality of sparse images, and further comprises:
   selecting each of the plurality of sparse images as an associated reference frame;
   combining each of the reference frames with one or more respective neighbor images in the obtained tilt series to produce respective replacement frames; and
   producing the tomographic image of the sample volume based on the images of the obtained tilt series and the replacement frames.

5. The method of claim 4, wherein combining each of the reference frames with one or more respective neighbor images in the obtained tilt series to produce the respective replacement frames includes aligning the references frames and the respective neighbor images.

6. The method of claim 5, further comprising replacing the reference frames in the obtained tilt series with the respective replacement frames and producing the tomographic image of the sample volume based on the tilt series with the replacement frames.

7. The method of claim 3, wherein at least two of the sparse images are associated with different sparsities.

8. The method of claim 1, wherein the CPB is an electron beam.

9. The method of claim 1, further comprising, with a CPB system, acquiring a tilt series, wherein the obtained tilt series is the acquired tilt series.

10. The method of claim 1, wherein the obtained tilt series is a reconstructed tilt series.

11. The method of claim 1, wherein the one or more neighbor images include at least a first image associated with a tilt angle that is less than a tilt angle associated with the reference frame and at least one image associated with a tilt angle that is greater than the tilt angle associated with the reference frame.

12. The method of claim 11, wherein the one or more neighbor images includes at least one adjacent image.

13. A CPB imaging system, comprising:
   a CPB source operable to produce a CPB;
   a CPB optical system operable to selectively direct the CPB from the CPB source to a sample;
   a detector situated to receive radiation in response to irradiation of the sample with the CPB;
   a stage configured to tilt the sample with respect to the CPB; and
   a controller operably coupled to the stage, the CPB optical system, and the detector to
      obtain a tilt series of images based on exposure of a sample to the CPB at a plurality of tilt angles, wherein the obtained tilt series includes a sparse image associated with a selected tilt angle;
      select an image of the obtained tilt series as a reference frame, wherein the selected image is a sparse image associated with the selected tilt angle; and
      combine the reference frame with one or more neighbor images in the obtained tilt series to produce a replacement frame;
      producing a tomographic image of a sample volume based on at least some images of the obtained tilt series and the replacement frame.

14. The CPB imaging system of claim 13, wherein the controller is operable to select one or more tilt angles for acquisition of sparse images so that the CPB is directed to the sample to obtain image data only at selected sample locations.

15. The CPB imaging system of claim 13, wherein the controller is operable to produce a tilt series of reconstructed images from the obtained tilt series.

16. The CPB imaging system of claim 15, wherein the controller is operable to determine replacement frames associated with each of tilt angles at which sparse images are acquired.

17. The CPB imaging system of claim 16, wherein the replacement frames are determined based on respective reference frames associated with corresponding tilt angles at which sparse images are acquired and two or more neighbor images in the tilt series of reconstructed images.

18. The CPB imaging system of claim 17, wherein the CPB imaging system is an electron microscope, the controller is operable to determine the replacement frames by aligning the two or more neighbor images in the tilt series of reconstructed images and the associated reference frames, and produce a tomographic image of the sample based on the tilt series of reconstructed images and the replacement frames.

19. A method of producing a tomographic image of a sample with an electron microscope, comprising:
   selecting a series of tilt angles for image acquisition;
   selecting a plurality of the tilt angles of the series of tilt angles for acquisition of sparse images;
   acquiring a tilt series of images with the electron microscope based on the selected series of tilt angles, including acquiring sparse images for the plurality of the tilt angles associated with acquisition of sparse images;
   producing a tilt series of reconstructed images based on the acquired tilt series, wherein at least one of the reconstructed images is based on a sparse image;
   selecting one or more of the reconstructed images as reference frames;
   aligning each of the reference frames and associated neighbor images based on the respective tilt angles;
   combining the aligned reference frames and the associated neighbor images to produce corresponding replacement frames;
   producing a replacement frame tilt series by replacing the reference frames with the corresponding replacement frames; and
   producing a tomographic image of the sample based on the replacement frame tilt series.

20. At least one non-transitory computer-readable medium comprising processor-executable instructions for the method of claim 19.

21. The CPB imaging system of claim 13, wherein the controller is operable to produce a tomographic image of a sample volume based on at least some images of the obtained tilt series and the replacement frame.

* * * * *